United States Patent
Marwah et al.

(10) Patent No.: US 6,170,438 B1
(45) Date of Patent: Jan. 9, 2001

(54) MULTIPURPOSE BATHROBE FOR PETS

(76) Inventors: Padma Marwah; Ashok Kumar Marwah, both of 229 N. Midvale Blvd., Apt. #3, Madison, WI (US) 53705

( * ) Notice: Under 35 U.S.C. 154(b), the term of this patent shall be extended for 0 days.

(21) Appl. No.: 09/262,521

(22) Filed: Mar. 4, 1999

(51) Int. Cl.$^7$ .................................................. A01K 13/00
(52) U.S. Cl. .............................................. 119/600; 54/79
(58) Field of Search ................................. 119/600, 601, 119/602, 603, 604, 605, 606, 627, 650, 653, 671, 678, 713, 714, 174, 907, 850, 853, 725; 54/79.1, 79.2, 79.4

(56) References Cited

U.S. PATENT DOCUMENTS

| | | | |
|---|---|---|---|
| 3,742,679 | * 7/1973 | Jordan | 119/850 |
| 3,918,238 | * 11/1975 | Iozzio | 119/850 |
| 4,169,428 | * 10/1979 | Waugh | 119/678 X |
| 4,796,567 | * 1/1989 | Allan et al. | 119/678 |
| 4,995,345 | * 2/1991 | Friedman | 119/678 |
| 5,060,597 | * 10/1991 | Fredericks | 119/678 |
| 5,230,304 | * 7/1993 | Santoro | 119/678 X |
| 5,309,866 | * 5/1994 | Santoro | 119/650 |
| 5,458,094 | * 10/1995 | Proshan | 119/850 |

* cited by examiner

*Primary Examiner*—Thomas Price

(57) ABSTRACT

A pet bathrobe for completely enclosing animal and made of one or more layers of water absorbent material. The bathrobe comprises a rectangular bag having four sides with small openings at both lower corners and an opening extending across entire longitudinal length of the upper side with one end extending into a cap like hood and other end having a small opening. The top opening can be closed with the help of a closure mechanism. The bathrobe may be covered with an optional detachable outer layer made of water impervious material and has a mechanism to hold bathrobe around animal's neck.

10 Claims, 1 Drawing Sheet

MULTIPURPOSE BATHROBE FOR PETS

CROSS REFERENCE TO RELATED APPLICATION

Not applicable

STATEMENT REGARDING FEDERALLY SPONSERED RESEARCH OR DEVELOPMENT

Not applicable

REFERENCE TO A MICROFICHE APPENDIX

Not applicable

BACKGROUND OF THE INVENTION

This invention generally relates to the discovery of a novel multipurpose bathrobe for pets.

This invention more particularly relates to the manufacture and use of a novel multipurpose bathrobe for small animals including dogs and cats so as to facilitate their handling etc. when desired and necessary.

This invention still more particularly relates to the discovery and manufacture of a new bathrobe for small animals as described and disclosed in this document. Said bathrobe has multiple uses and functions and can be, for example, used to dry animal after a tender bath, to restrain small animals like cats and small dogs while administering medication, cutting nails etc. and at the same time provides added protection to those handling the animal.

Keeping small animals like cats and dogs as pets has become a very common household practice. These pets require love and affection and continuous tender care. It is hygienic and desirable to bath them at regular intervals and then they need to be towel dried lest they shake off excess water from the body, jump on the couch, bed etc. and thus make the whole place wet and messy. Small animals in general and cats in particular have strong urge to scratch any thing they can. To avoid damage, their nails have to be clipped every now and then, and these animals in general and cats in particular hate to have their nails trimmed. In order to perform tasks such as trimming nails, administering medication by mouth etc., these animals need to be restrained properly to minimize the risk of being bitten or clawed by them.

To the best of our understanding and knowledge there does not exist any simple yet reliable device as explained herein and substantially disclosed in this document which serves many purposes including those of drying animal after bath and/or restraining animal when desired or necessary.

BRIEF SUMMARY OF THE INVENTION

In fulfillment and implementation of previously recited objects, a primary feature of present invention resides in the provision of a novel bathrobe for small animals, which is simple of construction and economical of manufacture. This novel bathrobe provides great help in safe and effective handling of small animals including house hold pets, by controlling them without applying any force. The present bathrobe embodies an elongated bag like device prepared from one or more layers of water absorbent and/or water absorbent and water impervious materials. The inner layer (s) of the bathrobe is (are) made up of thick yet soft water absorbent materials like cloth, preferably terry cloth/towel cloth or similar materials for absorbent purposes and softness or combination thereof. The outer detachable layer, when desired, can be made up of water impervious material like plastic, leather or similar material used for liner or combination thereof. The outer layer is attached at the upper ends of either side of inner layer(s) by means of zippers, buttons, strings etc. The bathrobe is made by closing on three sides by folding the material on its own and/or by stitching. The fourth side has a closure mechanism for releasably providing secured closed state and an open state of opening extending across entire longitudinal length of upper side, for example it can be closed with the help of a long zipper, buttons, tie strings or any other conventional means. The zipper extends from tail end side to the hood. The hood is a long opening, large enough to enable animal to take out his/her head through it but still acts like a cap on the head. The tail end has another small opening for the animal's tail to be taken out when necessary e.g. for taking anal temperature. The lower end also has one small opening at each corner for the purpose of taking out the pet's leg for the purpose of cutting nails etc when desired. The bathrobe is also held secured around the animals' neck if necessary, by tying loosely but securely around the neck by means of a wide strap or a belt built in or otherwise as is done in garments. This bathrobe can be made of different sizes to accommodate animals of various sizes. Preferably the bathrobe is sized to accommodate a cat or a small dog.

Last but not the least, the proper use of the present invention goes to a great extent in reducing the fear of inexperienced people, pet owners etc. in handling their animals at home and can help in avoiding the costs incurred by rushing to veterinarians for simple jobs. It is also helpful to the veterinarians while handling the animals for various purposes

BRIEF DESCRIPTION OF THE SEVERAL VIEWS OF THE DRAWING

A bathrobe for small animals embodying features of our invention is illustrated in the accompanying drawings, forming part of this application, in which.

Figure 1:
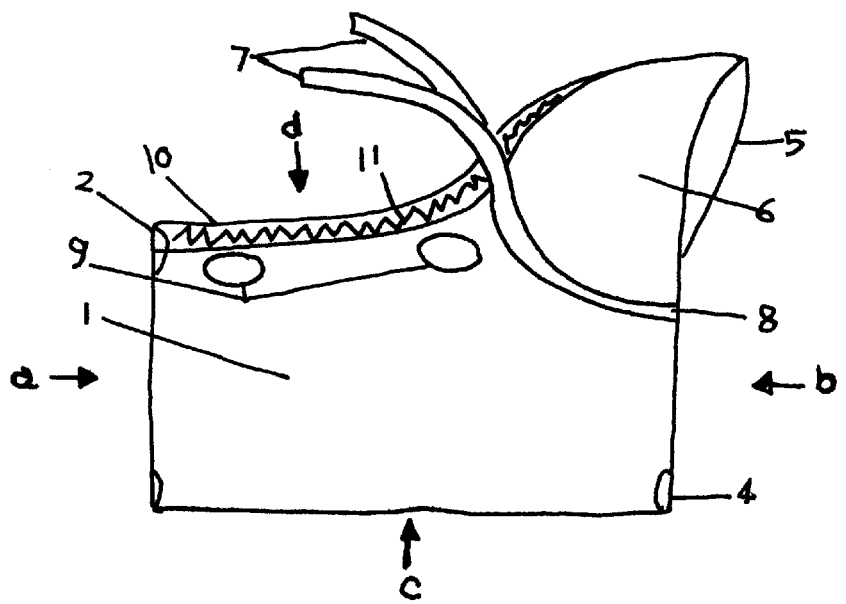
FIG. 1 shows a perspective view of a multipurpose pet's bathrobe according to the present invention

The different parts of the various figures are indicated with Arabic numerals in the drawing and in the text.

As shown in the drawings, the present invention provides a bathrobe for animals. Its three sides are closed as described. The fourth top side is wide open but can be closed with the help of a closure mechanism, preferably a long zipper, which extends from tail side to hood side. The hood is a long opening, large enough to enable animal to take out his/her head through it but still acts like a cap on the head. The tail end has another small opening for the animal's tail to be taken out if necessary. The two lower corners also have small openings for the purpose of taking out the pet's leg for the purpose of cutting nails etc when desired.

DETAILED DESCRIPTION OF THE INVENTION

The principle object of the present invention is to provide a novel bathrobe for the purpose of drying the wet animal as well as for the care and easy handling of small animals.

It also is an object of the present invention to provide such a device, which is of simple inexpensive construction and is easy to use and maintain.

This invention relates to the discovery and manufacture of a new bathrobe for small animals as described and disclosed in this document. The bathrobe has multiple uses and functions and can be for example used to dry wet animal after a tender bath, to control the small animals like cats and small dogs while administering medication through oral or rectal routes, cutting nails, feeding sick animals etc. These examples are illustrative only and by no mean exhaustive.

Furthermore the present invention also provides this device in a lightweight easily washable form which can be used in a multiple ways.

The proper and appropriate use of the present invention also helps in reducing and alleviating the fear of inexperienced as well as experienced persons and veterinarians alike while handling the animals for various purposes. The pet owners can happily and comfortably take care of their pets by themselves since said invented bathrobe assures a great deal of protection against scratching and biting by animal. Besides, the pet owners may save a lot of money by performing these functions themselves thereby avoiding the need to seek the help of the professionals.

Figure 2:
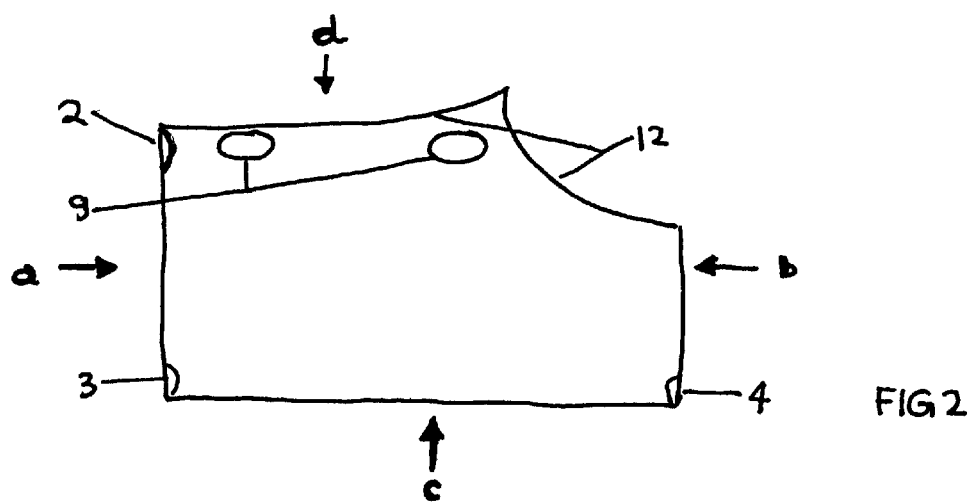
FIG. 2 shows an outer covering for the bathrobe, which is detachable and optional.

In fulfillment and implementation of previously recited objects, a primary feature of the invention resides in the provision of a novel bathrobe for small animals, which is simple of construction and economical of manufacture and is schematically shown in FIG. 1 and FIG. 2.

With reference to FIG. 1, there is shown a multipurpose pet bathrobe, which is of a lightweight construction. It is soft and cozy and is constructed to completely enclose a pet therein. It completely encloses the pet for effectively drying the wet animal or for restraining the pet at the time of necessity such as while taking the anal temperature of the sick animal.

Pet bathrobe, as depicted in FIG. 1, is a sac like structure. It is made up of one or more layers of same or different types of thick yet soft water absorbent materials like cloth, preferably terry cloth, towel cloth or similar materials for absorbent purposes and softness or combination thereof. The present bathrobe is made simply by closing the three sides by cutting, connecting and/or folding the cloth or cloth like material on its own and/or by sewing, with one side of upper end extending into a cap or hood 6. In a preferred embodiment of the present invention, the pet bathrobe is made of a single layer of the said water absorbent material. The pet bathrobe can be made of various sizes to provide ample space to the pets of different sizes to snuggle in comfortably. More preferably the bathrobe is sized to accommodate a cat or a small dog.

The pet bathrobe (FIG. 1) is closed on three sides (a, b and c) as described. The left side a has a small opening 2 (~2–24 inches long) in the topside of the robe for the animal's tail to be taken out, when required. The right side b has a large hood opening 5, which is big enough for the animal to take their face out. The side c (the lower side) also has two small openings 3 and 4 one at each lower corner. These two lower openings are extremely helpful and convenient for taking out the pet's leg for the purpose of cutting nails etc.

The upper side d envisages a large opening 10 extending across the entire length of the bathrobe i.e. from side a to side b extending up to the upper top hood. The opening 10 on the side d can be in a fully or partially opened state or fully closed state thereof, by means of a suitable closure mechanism 11 such as providing with zipper, hooks, loop fasteners, straps etc. or any combination thereof i.e. the means used to close the two sides of a garment or a garment like is thing. The zipper 11, when used as closure mechanism, is stitched in such a way that its inner side is protected by a flap of cloth so that while closing the zipper the animal's hair do not cause it to get stuck and malfunction. The purpose of this large opening 10 is to safely keep the animal inside the bathrobe so that after closing the opening a soft, warm, cozy and comfortable robe is provided to the pet without harming the animal. The present invention also provides proper circulation of air for animal to breathe in.

The pet bathrobe as shown in FIG. 1 is also provided with a small wide strap or belt 7 which is attached to the bottom of the hood in such a way that it makes a neck like structure 8. It can be wrapped properly around the neck of the animal if required, so as to restrain the animal from coming out.

The bathrobe (FIG. 1) can easily be cleaned by washing in the washing machine or otherwise as it is made from water absorbent material, and thus provides the utmost hygiene to the pets as well as to their owners.

FIG. 2 shows outer optional sac like structure, which is made up of water impervious material like plastic, leather, natural or synthetic or similar waterresistant material used for cover or combination thereof. It is made to cover the bathrobe excluding hood 6 (FIG. 1) from outside. This outer layer is attached to the pet robe on either upper side of the body of the bathrobe 1 by an attachment is device 9 such as zippers, buttons, straps etc. Outer detachable layer (FIG. 2) has small openings 2 3 and 4 which are cut to fit openings of same size 2 3 and 4 of bathrobe 1 as shown in FIG. 1. Upper end of the side b of outer optional detachable cover has another large opening 12 (FIG. 2) which is cut to fit around the neckline 8 below the hood 6 of pet bathrobe 1 (FIG. 1) and follows around large opening 10 on side d of the pet bathrobe 1 (FIG. 1).

The use of the detachable outer layer for said pet bathrobe is an example of the alternative embodiment of present invention. It is useful as water protector and can provide extra protection in keeping the furniture, cushion or carpet etc dry when the wet animal wrapped in his/her bathrobe sits on these surfaces. This arrangement is totally harmless to the animal and does not in any way create trouble in breathing. The outer layer as and when desired also adds extra safety while handling the animal. This outer cover is completely optional and it depends upon the pet owner to use it or not. Keeping this in mind It has been provided in a completely detachable form and is simple of construction.

Figure 3:
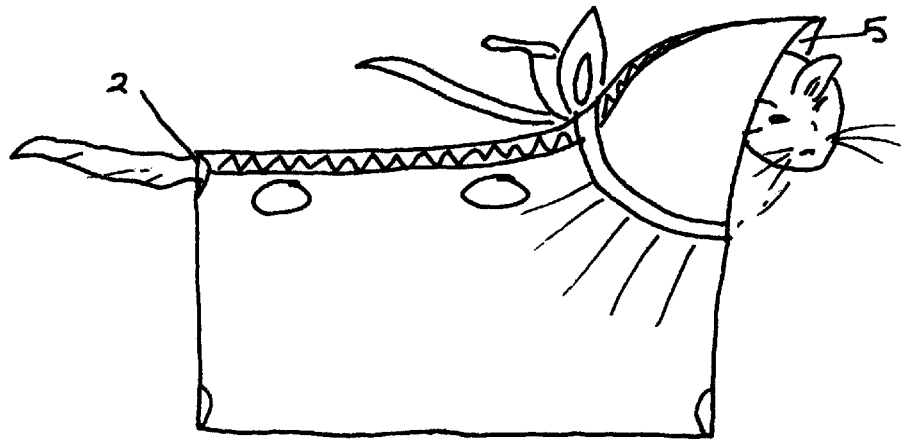
FIG. 3 shows the placement of a pet inside said bathrobe.

The FIG. 3 is a perspective view of the present invention as intended to be, housing a pet inside. This figure shows the pet enclosed inside the robe with his/her tail taken out from opening 2 and face peeping out of opening 5. Tail out situation is usually required when the anal temperature is to be taken while rest of the body of the pet is inside the robe. In normal situations tail can also be kept inside the robe. The hood opening 5 can be used for force feeding the sick animal while rest of the body is enclosed in bathrobe.

This protective, comfortable, inexpensive yet simple and effective bathrobe has multiple functions and usage in performing proper care and safe handling of small animals including house hold pets by restraining them without applying any force. This bathrobe on one hand provides warmth and comfort to the animal (cats just love it) and on the other hand, provides protection to the owner leading to more confidence while performing various day to day tasks on the animal at home. At the same time the present invention is equally useful to the veterinarians while handling the pets, particularly the sick ones, which are more likely to bite or attack.

The invention has been described with reference to the preferred embodiments thereof, which are illustrative and not limiting. Various changes may be made without departing from the spirit and scope of the invention as defined in the appended claims.

We claim:

1. A protective pet bath-robe for completely enclosing an animal made of one or more layers of a water absorbent material, the bathrobe comprising a bag like structure having an upper side, a lower side, two vertical sides, a front and a back and a hood portion, sized to define a comfortable space for an animal therein, said pet bath-robe made by closing said upper and lower sides and one of said two vertical sides;

a small opening at each lower corner of said vertical sides of said bag for taking out a leg of animal when required;

a closeable opening provided to receive pet, extending across entire length of said upper side and a closure mechanism for releasably providing secured closed state and an open state of said opening;

a hood portion emergent from said upper side as a continuous extension thereof with an opening on one of vertical sides which is big enough for animal to take its face out and a small opening at upper corner of other vertical side for animal's tail to be taken out; and a mechanism to hold bathrobe around animal's neck thus restraining the animal from stepping out of bathrobe.

2. A bathrobe as claimed in claim 1 wherein said animal bathrobe is made from an absorbent cloth-like material.

3. A bathrobe as claimed in claim 2 wherein said absorbent cloth-like material is towel cloth.

4. A bathrobe as claimed in claim 1, wherein said mechanism is a zipper which is movable along said closeable opening on the upper side to provide the open state and the closed state of said upper opening.

5. A bathrobe as claimed in claim 1 wherein said bathrobe is covered with a detachable outer layer made of water impervious material.

6. A bathrobe as claimed in claim 1 in which outer layer is attached to upper part of front side and upper part of backside of body of bathrobe with the help of a conventional attachment device.

7. A bathrobe as claimed in claim 6, in which conventional attachment device is a zipper, buttons, straps etc.

8. A bathrobe as claimed in claim 1 wherein said bathrobe is made from more than one layers of an absorbent cloth-like material.

9. A protective pet bath-robe for completely enclosing an animal made of one or more layers of towel cloth material, the bathrobe comprising a bag like structure having an upper side, a lower side, two vertical sides, a front and a back and a hood portion, sized to define a comfortable space for an animal therein, said pet bath-robe made by closing the three sides by connecting towel cloth material;

a small opening at each lower corner of said vertical sides of said bag for taking out a leg of animal when required;

a closeable opening provided to receive pet, extending across entire length of said upper side and a zipper movable along upper opening for releasably providing secured closed state and an open state of said opening;

hood portion emergent from said upper side as a continuous extension thereof with an opening on upper side of one of vertical sides which is big enough for animal to take its face out and a small opening at upper corner of other vertical side for animal's tail to be taken out; and a mechanism to hold bathrobe around animal's neck thus restraining the animal from stepping out of bathrobe.

10. A bathrobe as claimed in claim 9 wherein said bathrobe is covered with a detachable outer layer made of water impervious material.

\* \* \* \* \*